United States Patent [19]

Porcaro

[11] Patent Number: 5,745,750
[45] Date of Patent: Apr. 28, 1998

[54] PROCESS AND ARTICLE OF MANUFACTURE FOR CONSTRUCTING AND OPTIMIZING TRANSACTION LOGS FOR MOBILE FILE SYSTEMS

[75] Inventor: Thomas Joseph Porcaro, Austin, Tex.

[73] Assignee: International Business Machines Corporation, Armonk, N.Y.

[21] Appl. No.: 572,923

[22] Filed: Dec. 15, 1995

[51] Int. Cl.$^6$ .................................................. G06F 17/30
[52] U.S. Cl. ........................ 395/613; 395/612; 395/602
[58] Field of Search .................................. 395/613, 602, 395/612, 650, 575; 364/200

[56] References Cited

U.S. PATENT DOCUMENTS

| | | | |
|---|---|---|---|
| 4,945,474 | 7/1990 | Elliot et al. | 364/200 |
| 5,201,044 | 4/1993 | Frey, Jr. et al. | 395/575 |
| 5,437,026 | 7/1995 | Borman et al. | 395/602 |
| 5,455,946 | 10/1995 | Mohan et al. | 395/602 |
| 5,455,947 | 10/1995 | Suzuki et al. | 395/650 |

OTHER PUBLICATIONS

Rao, Towards a National Collaboratory: An Internet File System, IEEE, pp. 489498 Jun. 1992.

Dharap et al, Type Structured File System, IEEE, pp. 208–212 Dec. 1993.

Rao et al., Accessing Files in an Internet: The Jade File System, IEEE, pp. 613–624 Jun. 1993.

Kumar et al, Log Based Directory Resolution in the Codata File System, IEEE, pp. 202–213 Jan. 1993.

Cabera et al, QuickSilver Distributed File Services: An Architecture for Horizontal Growth, IEEE, pp. 23–37 Mar. 1988.

Thomas, A Mandatory Access Control Mechanism for the Unix File System, IEEE, pp. 173–177 Dec. 1988.

Kistler, Disconnected Operation in the CODA File System; sections 4.41 and 6.2, Carnegie Mellon University, pp. 10 and 120–131 1993.

Disconnected Operation in a Distributed File System, Section 6.2, May 1993, "Transaction Logging", J. J. Kistler, pp. 120–133.

Disconnected Operation in The Coda File System, Section 4.4.1 "Logging", Kistler et al, p. 10, Feb. 1992.

Primary Examiner—Thomas G. Black
Assistant Examiner—Frantz Coby
Attorney, Agent, or Firm—Mark S. Walker

[57] ABSTRACT

A process and article of manufacture for optimally logging and replaying file system transactions from a mobile file system. The process logs file system transactions in chronological order except for file and directory object renaming transactions that are logged before all other transactions. Each transaction log entry includes a transaction type and file identifier that is expanded dynamically during the replay cycle. The dynamic expansion of the identifier reduces the number of log entries required where file or directory objects are renamed. The transaction log is optimized as each transaction is inserted or appended on the client. The optimization process eliminates transactions that are rendered invalid or superfluous by the most recent transaction. The dynamic expansion feature allows RENAME transactions to be optimized because MKDIR and CREATE transactions automatically are expanded to the new file system object name, eliminating the need to log the RENAME transaction. Successive RENAME transactions are folded into a single RENAME transaction to reduce log size and playback resource requirements.

12 Claims, 3 Drawing Sheets

PROCESS AND ARTICLE OF MANUFACTURE FOR CONSTRUCTING AND OPTIMIZING TRANSACTION LOGS FOR MOBILE FILE SYSTEMS

CROSS-REFERENCE TO RELATED APPLICATIONS

The present invention is related to the application entitled "Improved Method and Article of Manufacture for Resynchronizing Client/Server File Systems and Resolving File System Conflicts" application No. 08/572,926, filed on Dec. 12, 1995.

BACKGROUND OF THE INVENTION

1. Field of the Invention

The present invention relates to a process and article of manufacture for managing computer file system transactions and, in particular, for managing a disconnected computer file system. Still more particularly, the present invention relates to the management and optimization of a transaction log for collecting disconnected file system transactions for re-execution when the file system is connected.

2. Background and Related Art

Distributed computer systems allow a number of computer "clients" to access a server and to share files on that server. The client workstation is typically connected to the server through some form of network. Laptop computers provide a mobile computing environment to people who must travel in their work or take work with them to customer or work sites. Laptop computers can be connected into a network through either a wired connection, a dial-in connection or some form of optical or radio connection. Infrared connection between a laptop computer and a server is particularly easy to use as the laptop computer must simply be placed in the line of sight of the server infrared sensor.

Any distributed computer environment has the possibility of network interruption and temporary disconnection. Mobile computing using laptop computers increases the frequency of disconnection and includes disconnected operation as a normal operating mode.

Disconnected operation is facilitated by a file caching facility. The CODA system developed by Carnegie Mellon University provides file caching for the Andrew File System (AFS.) CODA provides a mechanism for caching data on a client computer. Changes to the data are logged on the client computer then replayed to the server. Changes that conflict with the current state of the server computer are flagged and their application deferred. Logging operations in CODA are described in: KISTLER, J. J. DISCONNECTED OPERATIONS IN A DISTRIBUTED FILE SYSTEM. PhD Thesis, Carnegie Mellon University, School of Computer Science, 1993. Section 6.2 "Transaction Logging" pp. 120–133; and KISTLER, J. J., AND SATYANARAYANAN, M. "Disconnected Operation in the Coda File System." ACM TRANSACTIONS ON COMPUTER SYSTEMS 10, 1 (February 1992) Section 4.4.1 "Logging".

Another file system for disconnected operations is the Mobile File Sync system from IBM Corp. This system is described in U.S. patent application Ser. No. 08/206,706 file Mar. 7, 1994 and bearing attorney docket number AT994-014.

Mobile file systems allow the user to connect to a remote server, access files, disconnect and yet still maintain access to the same accessed files. Disconnected file access is supported by caching a copy of the file on the local client machine when it is connected to the remote server. Changes made to the disconnected file system by the user are tracked and re-executed or replayed to the server when a connection is re-established with the remote server.

The mobile file system must record all transactions that modify the disconnected file system. A logging process is used to track all file system modifications on the cached client and then supports replay of the transactions onto the server. The logging process applies special rules to reorder and optimize the transaction log. Optimization is required to minimize the storage consumed by the transaction log and to minimize the amount of time required to replay and resynchronize the client with the server file system.

A technical problem therefore exists of providing a set of optimization rules that minimize the log size and replay time without sacrificing the ability to accurately track file system modifications.

SUMMARY OF THE INVENTION

The present invention is directed to providing a process and article of manufacture for constructing and optimizing a disconnected file system transaction log. The present invention constructs the log by grouping the transactions for efficient and accurate playback to the server. The file system transactions are identified by a file identifier or FID that is dynamically expanded into the full path name of the file during replay. Dynamic file identifier (FID) expansion reduces the amount of information collected for each transaction and allows greater optimization of the transaction log than is possible with prior art logging methods.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
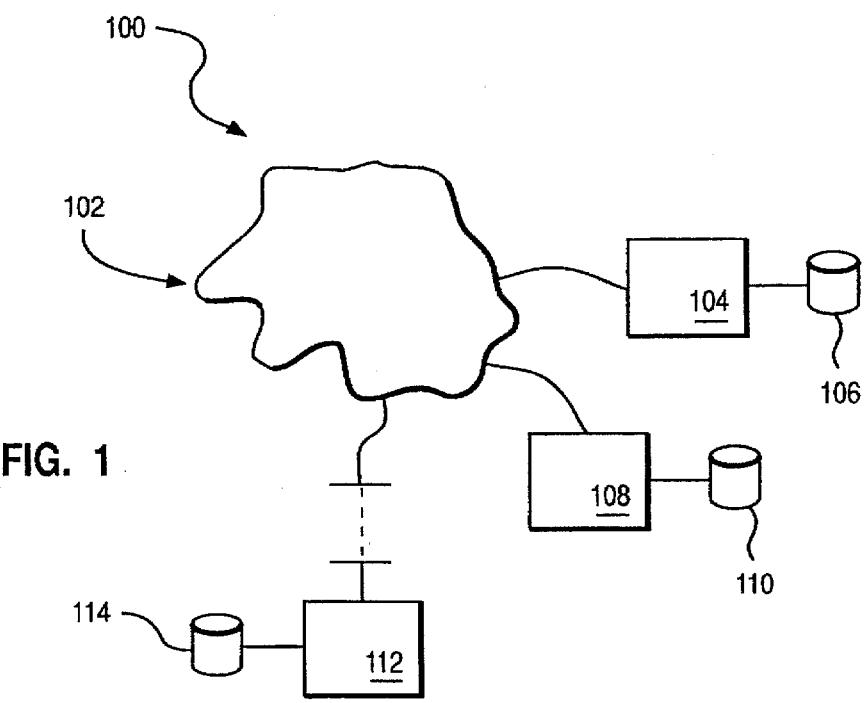
FIG. 1 is a block diagram of a network system according to the present invention.

The present invention operates in a networked computer system such as that shown generally at 100 in FIG. 1. A network 102 connects a number of workstations 104, 108, 112. One of the workstations, e.g. 104, may function as a server. The network 102 can be any known local area network or wide area network such as a token ring or Ethernet network managed by a protocol such as NetBIOS or TCP/IP. Each workstation may or may not contain permanent storage such as hard disks 106, 114, 110. Workstation 112 is shown as being a disconnectable workstation. This workstation is connected through an interface such as an infrared interface. It could also be connected using dial telephone lines. Workstation 112 operates frequently in a disconnected mode and must synchronize with server 104 and the file system contained on permanent storage 106.

Figure 2:
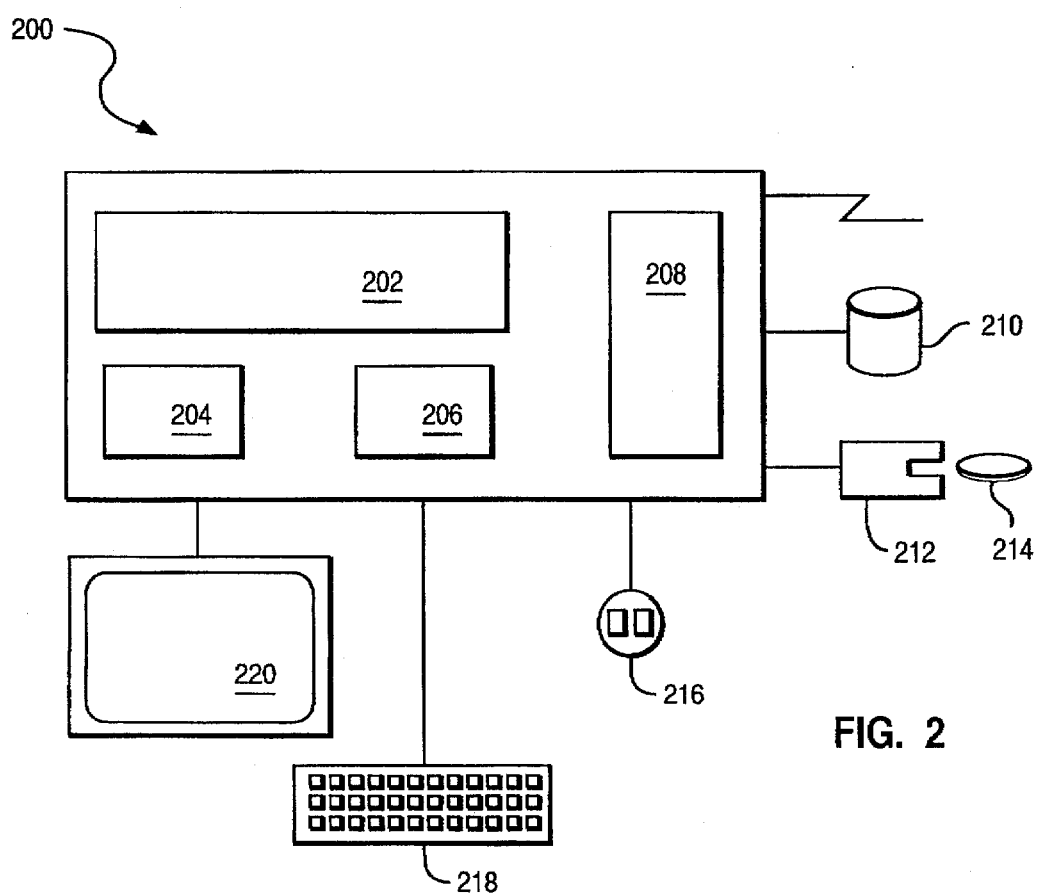
FIG. 2 is a block diagram of a computer system according to the present invention.

Each computer system contains elements similar to those shown in FIG. 2. This configuration is shown as an example only and any other computer configuration could be employed without departing from the invention.

Computer system 200 has a processor element 204 that contains one or more central processing units (CPUs.) Memory 202 is provided to store programs and data. I/O controller 208 controls the communication between the computer system and peripheral devices such as the display screen 220, keyboard 218, pointing device 216, and fixed and removable storage, 210 and 212. Removable storage can be any device such as a diskette drive for magnetic or optical disks 214.

The computer system for the present invention can be any computer system having these basic components. The preferred embodiment uses an IBM Personal Computer or IBM PS/2® system. The invention can also be practice on an IBM RISC System/6000®. The present invention operates in conjunction with an operating system such as the IBM OS/2® operating system, the Microsoft Windows® operating system or the IBM AIX® operating system. Each of these operating systems supports a file system with defined rules for file system management.

The present invention is implemented as part of the logging process in the disconnected client workstation. The logging process records information about each user transaction that modifies the file system structure or content. These transactions can include replacing a file, deleting or removing a file, or creating a new directory or file. These transactions are continuously added to the transaction log to form a chain of transactions to be replayed on the server when a connection is established.

The following is a list of transactions supported by the OS/2 operating system file system:

CREATE Creates a new file.
STORE Stores data into a pre-existing file.
REMOVE Erases a file.
MKDIR Creates a new directory.
RMDIR Removes a directory.
RENAME Renames a file or directory possibly changing its path.

Figure 3:
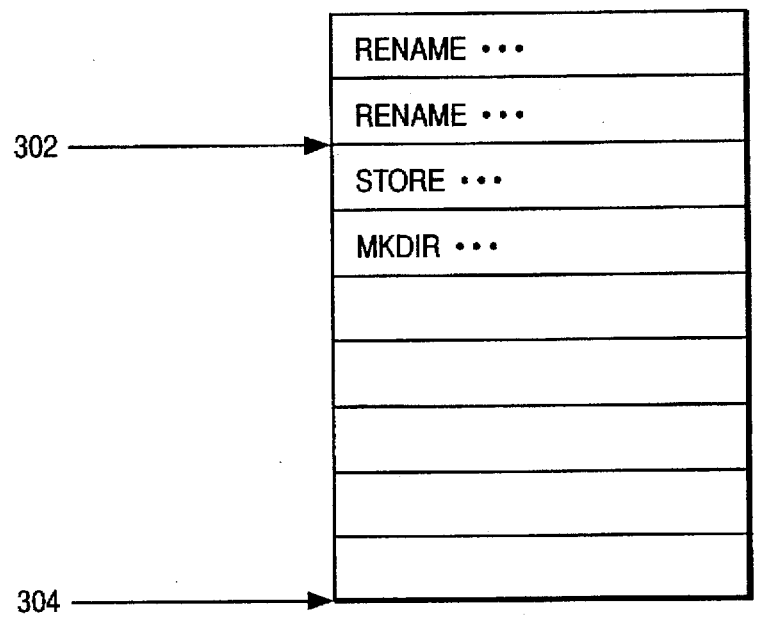
FIG. 3 is a diagram of the transaction log according to the present invention.
Figure 4:
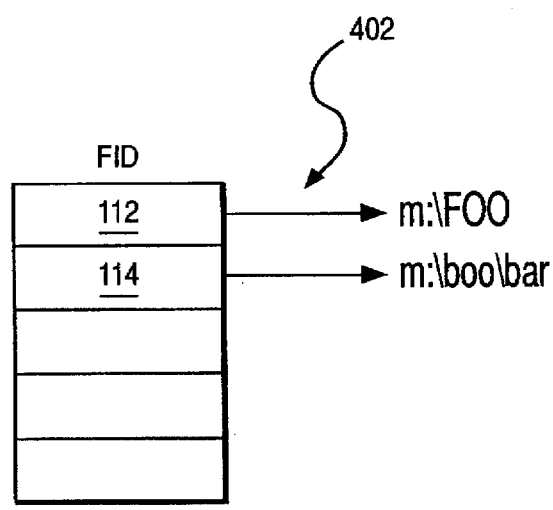
FIG. 4 is a diagram illustrating the mapping of file identifier (FID) to full path name according to the present invention.

Each new transaction may be (1) appended to the log, (2) inserted into the log, or (3) optimized out of the log and possibly canceling prior transactions. The following list better describes these three logging operations and the conditional rules governing their execution. FIG. 3 illustrates a transaction log according to the present invention. The transaction log is maintained preferably in the memory or permanent storage of the client computer system. A transaction log maintained in memory must be periodically copied to persistent storage to ensure that no data is lost.

1. LOG ENTRY APPENSION

All transactions other than RENAME are appended to the transaction log under normal circumstances (i.e. CREATE, MKDIR, REMOVE, RMDIR, and STORE.) The executing order of these transactions is maintained in the log because each transaction is added chronologically to the end of the log file, e.g. 304.

The log entry for each of these transactions contains a dynamic path for the target (i.e. file or directory) of the transaction. A dynamic path is one which is expanded during the REPLAY process. This dynamic path is represented internally as a FID (file identifier). The file identifier (FID) associated with the transaction is expanded dynamically during the REPLAY process to generate the absolute path of the target file or directory thus allowing the transaction to be replayed on the server, e.g. 402. The file identifier (FID) is expanded through a series of searches on the hierarchy of file system objects composing the mobile file system.

The use of dynamic path expansion in the present invention is much more efficient for log processing and easier to maintain than the hard-coded path names used in prior art systems. For instance, if a new file "bar" was created on the client by a CREATE transaction in the directory "m:\foo", then a new file identifier (FID) "X" would be allocated representing the new file "m:\foo\bar". If at a later point in time, directory "foo" were changed by the user to "boo" with a RENAME transaction, the log entry for CREATE would NOT need to be updated since the file identifier (FID) "X" would automatically expand to "m:\boo\bar" during the REPLAY process. This design also allows for some RENAME transactions to be optimized out of the log. This will be discussed below in LOG OPTIMIZATION.

2. LOG ENTRY INSERTION

The RENAME transactions are the only transactions which are inserted into the log rather than appended too it. Each RENAME transaction will be inserted at the beginning of the log following the last RENAME transaction inserted e.g., 302. This maintains the chronological ordering of the RENAME transactions and also ensures that all RENAME transactions will be REPLAYED before any other transaction types. It is necessary for RENAME transactions to be REPLAYED first since the file system component names on the server must be modified to match those on the client before any additional components may be added or original components deleted. This is required because the path names for all transactions other than the RENAME transaction are expanded dynamically. Therefore, each component name within the expanded path for a single transaction will represent the latest name assigned by the client during disconnection via a RENAME transaction. For instance, suppose a new file "bar" were created on the client via a CREATE transaction in the directory "m:\foo". Then a new file identifier (FID) "X" would be allocated representing the new file "m:\foo\bar". Again suppose at a later point in time, directory "foo" were changed by the user to "boo" with a RENAME transaction. If the CREATE and RENAME transactions had been appended to the log in the order in which they occurred, then the CREATE transaction would be REPLAYED first and the file identifier (FID) "X" would expand to "m:\boo\bar"; however, the directory "m:\boo" does not yet exist on the server since the RENAME transaction has not yet changed "m:\foo" to "m:\boo". Therefore, the dynamic expansion of component names forces us to insert RENAME transactions before other transaction types so that, in this case, the directory "m:\foo" is renamed to "m:\boo" before an attempt is made to create the file "m:\boo\bar" on the server.

Also, by their very nature, RENAME transactions are the only transactions whose path names are not expanded dynamically. These transactions have both a source and target path name which are; hard-coded within the transaction itself. The source path name must be hard-coded. If not, then during REPLAY an attempt would be made to rename the file or directory onto itself since both source and target are associated with the same file identifier (FID) and would expand to the same name. The target path name must also be hard-coded so that it matches the naming tree on the server during REPLAY. For instance, suppose that while disconnected from the server, the user renames file "m:\foo\bar" to "m:\foo\bat". Again suppose, that at some later point in time the user renames the parent directory "m:\foo" to "m:\boo". At the time when the first RENAME transaction is replayed, if the target path name was expanded dynamically then an attempt would be made to rename "m:\foo\bar" too "m:\boo\bat". This transaction would fail since "m:\boo" does not yet exist on the server until the following RENAME transaction were replayed to rename "m:\foo" to "m:\boo".

3. LOG OPTIMIZATIONS

Figure 5:
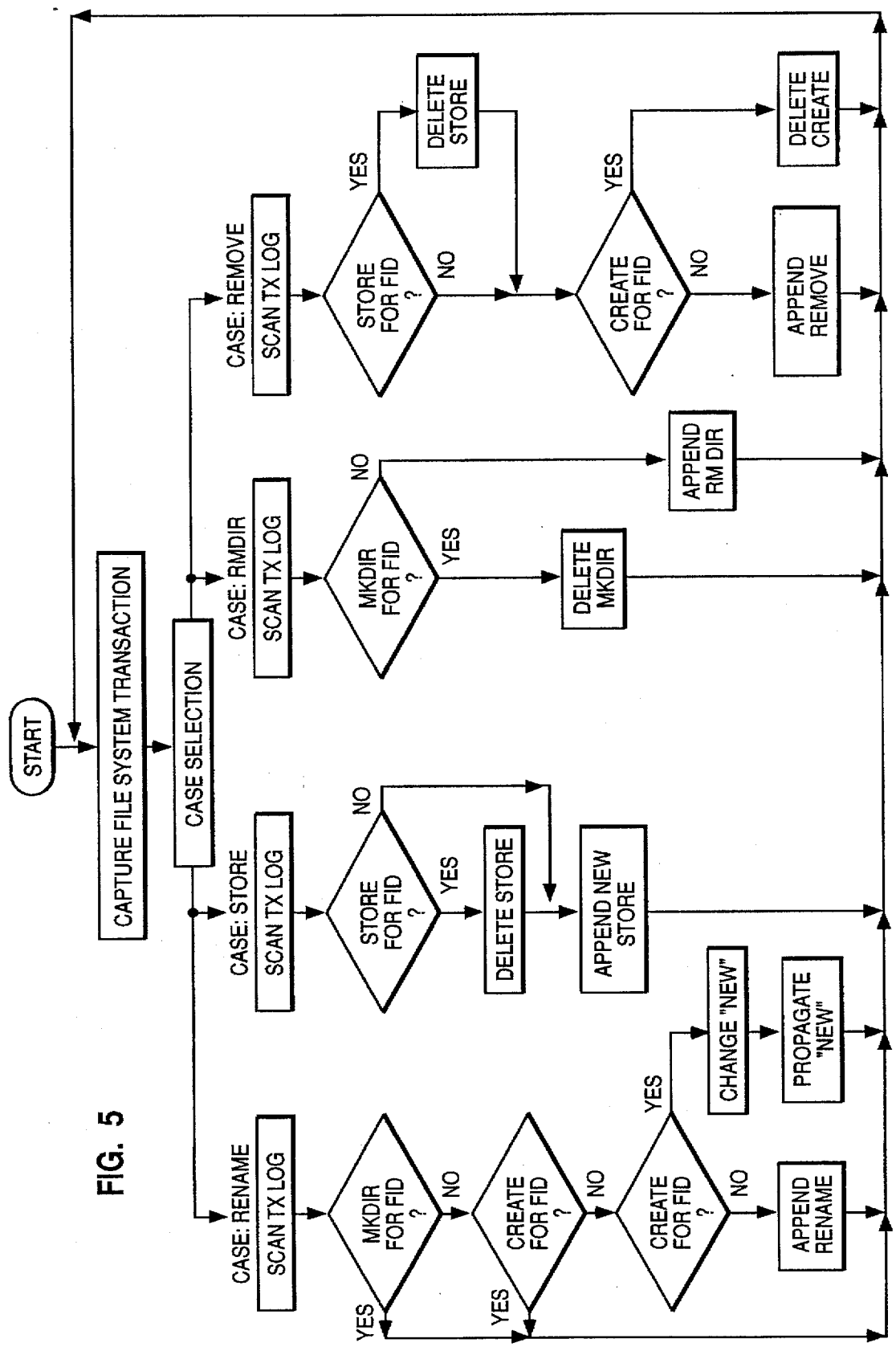
FIG. 5 is a flowchart of the novel transaction log optimization according to the present invention.

Optimization of the transaction log helps reduce transaction log space requirements and improve the performance of the REPLAY process as the mobile file system attempts to synchronize both the server and client file system images. It does so by reducing the total number of transactions in the log. Optimization occurs as a new log entry is examined for entry. New transactions can sometimes (1) be ignored, (2) modify existing transactions, or (3) cancel out existing transactions. The following is list of cases in which these types of log optimizations can occur (refer to FIG. 5 for a flowchart of the process of log optimization):

a. STORE OPTIMIZATION

If a STORE transaction is encountered with a file identifier (FID) which matches an already existing STORE transaction in the log then the STORE transaction in the log can be effectively replaced by deleting the old transaction and then appending the new transaction to the log. In other words, if the contents of a file are stored more than once then only the last store is necessary for REPLAY since it will supersede all previous stores too the same file.

b. MKDIR/RMDIR OPTIMIZATION

If a RMDIR (remove directory) transaction is encountered with a file identifier (FID) which matches an already existing MKDIR (make directory) transaction in the log then the MKDIR transaction in the log may be deleted and the RMDIR transaction ignored. In other words, if the user is removing a directory which was created while disconnected, then the two transactions cancel each other out and it is not necessary to log either one of them. There is no reason to make directories on the server if we are only going to remove them.

The fact that the RMDIR is being logged implies that the directory is empty. If not, then an error would have been returned to the user. Therefore, there are no additional log optimizations to be made such as removing any files created in the directory.

c. CREATE/REMOVE OPTIMIZATION

If a REMOVE transaction is encountered with a file identifier (FID) which matches an already existing CREATE transaction in the log then the CREATE transaction in the log may be deleted and the REMOVE transaction ignored. In other words, if the user is deleting a file which was created while disconnected, then the two transactions cancel each other out and it is not necessary to log either one of them. There is no reason to create files on the server if we are only going to delete them.

d. STORE/REMOVE OPTIMIZATION

If a REMOVE transaction is encountered with a file identifier (FID) which matches an already existing STORE transaction in the log then the STORE transaction in the log may be deleted and the REMOVE transaction appended. In other words, if the user is deleting a file whose contents was modified while disconnected, then the STORE transaction is canceled out and it is not necessary to log that transaction. There is no reason to change the contents of a file on the server if we are only going to delete it.

e. MKDIR/RENAME OPTIMIZATION

If a RENAME transaction is encountered with a file identifier (FID) which matches an existing MKDIR transaction in the log then the RENAME transaction may be ignored. The reasoning for this, is that the RENAME transaction has already changed the name of the directory on the client. Therefore, when the MKDIR transaction's dynamic path name is expanded during REPLAY, it will already evaluate to the new name. Thus, there is no reason to rename the directory again on the server. For example, suppose the user creates a directory "foo" on the client while disconnected via a MKDIR transaction. Then a new file identifier (FID) "X" would be allocated representing the new directory "m:\foo". Again suppose at a later point in time, directory "foo" were changed by the user to "boo" via a RENAME transaction. At that time the RENAME transaction can be optimized out of the log. During the REPLAY process, the MKDIR transaction would be REPLAYED and file identifier (FID) "X" would be expanded to create the directory "m:\boo". At this point the final desired result has been achieved. REPLAYING the RENAME transaction would have only been superfluous.

f. CREATE/RENAME OPTIMIZATION

If a RENAME transaction is encountered with a file identifier (FID) which matches an already existing CREATE transaction in the log then the RENAME transaction may be ignored. The reasoning for this, is that the RENAME transaction has already changed the name of the file on the client. Therefore, when the CREATE transaction's dynamic path name is expanded during REPLAY, it will already evaluate to the new name. Thus, there is no reason to rename the file again on the server. For example, suppose the user creates a file "bar" on the client while disconnected via a CREATE transaction. Then a new file identifier (FID) "X" would be allocated representing the new file "m:\bar". Again suppose at a later point in time, file "bar" were changed by the user to "bat" via a RENAME transaction. At that time the RENAME transaction can be optimized out of the log. During the REPLAY process, the CREATE transaction would be REPLAYED and file identifier (FID) "X" would be expanded to create the file "m:\bat". At this point the final desired result has been achieved. REPLAYING the RENAME transaction would have only been superfluous.

g. RENAME/RENAME OPTIMIZATION

If a RENAME transaction is encountered with a file identifier (FID) which matches an already existing RENAME transaction in the log then the hard-coded target path of the RENAME transaction already in the log may be replaced with the new target path from the pending RENAME transaction and the pending RENAME transaction may then be discarded. The reasoning for this, is that a single RENAME transaction is all that is ever required per source file or directory. Renaming a file or directory multiple times can always be reduced to a single RENAME transaction.

When this optimization takes place, the new target path must be propagated throughout the log to all subsequent ordered RENAME transactions. This is necessary, since RENAME transactions have hard-coded paths instead of dynamic paths. For each consecutive RENAME transaction following the updated transaction, both the source and target paths must be checked for sub-strings equivalent to the old target path which was modified. If located, then the old target path sub-string must be substituted with the new target path sub-string. Consider the following example:

Transaction Log (Original)

RENAME Fid=112 Old="m:\foo" New="m:\boo"

RENAME Fid=114 Old="m:\boo\bar" New="m:\boo\bat"

STORE Fid=114 (Expands dynamically to "m:\boo\bat")

New Transaction

RENAME Fid=112 Old="m:\boo" New="m:\zoo"

Transaction Log (Updated)

* RENAME Fid=112 Old="m:\foo" New="m:\zoo"
* RENAME Fid=114 Old="m:\zoo\bar" New="m:\zoo\bat"

STORE Fid=114 (Expands dynamically to "m:\zoo\bat")

* denotes transactions which were updated

In this example the new RENAME transaction has the same FID=112 as a RENAME transaction already existing in the log. Therefore, the target path of the transaction in the log "m:\boo" is replaced with the new target path "m:\zoo". Now, the new RENAME transaction may be discarded but it is still necessary to propagate the new target path to the remaining RENAME transactions residing in the log thus far. By searching for the old target sub-string "m:\boo" in the remaining RENAME transactions, we find a match for Fid=114. We then replace the sub-string "m:\boo" with "m:\zoo" in both the source and target path of this RENAME transaction and continue searching until we encounter the first transaction which is not a RENAME. At that point the search is terminated, since all RENAME transactions are grouped at the beginning of the log. In this case, the STORE for Fid=114 was encountered which terminated the search. Note that the STORE transaction need not be modified since its path is expanded dynamically during REPLAY.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

I claim:

1. A method for optimizing a file system transaction log for a computer file system, the computer system having a processor means and memory means, the method comprising the steps of:

capturing file system transactions;

testing each of said file system transaction for transaction type;

inserting each object rename transaction as a rename transaction log entry having a dynamic path identifier into a transaction log following other object rename transactions and before all other transactions;

appending all other non-rename object transactions as a file system transaction log entry having a dynamic path identifier at the end of said transaction log.

2. The method of claim 1, in which said object rename transactions include file rename transactions and directory rename transactions.

3. The method of claim 1 wherein said non-rename object transactions include file and directory operation transactions.

4. The method of claim 1, further comprising the steps of:

optimizing said transaction log by eliminating superseded transactions.

5. The method of claim 4 wherein the optimizing step for rename transactions includes the steps of:

scanning said transaction log for a mkdir transaction that matches the rename transaction and performing the inserting each object rename transaction step only if no mkdir transaction is found;

scanning said transaction log for a create transaction that matches the rename transaction and performing the inserting each object rename transaction step only if no create transaction is found;

scanning said transaction log for a rename transaction that matches the rename transaction and, if found, changing the "new" object name in the found rename transaction and propagating the "new" name to other object rename transactions, and inserting each new object rename transaction only if no rename transaction is found.

6. The method of claim 1, wherein said rename transaction log entry includes a transaction type, a file identifier, an old object name and a new object name.

7. The method of claim 1, wherein the file system transaction log entry dynamic path identifier is a file identifier.

8. A computer program product having a computer readable medium having computer program logic recorded thereon for optimizing a file system transaction log for a computer file system, the computer system having a processor means and memory means, said computer program product comprising:

computer program product means for causing a computer system to capture file system transactions;

computer program product means for causing a computer system to test each of said file system transactions for transaction type;

computer program product means for causing a computer system to insert each object rename transaction as a rename transaction log having a dynamic path identifier into a transaction log following other object rename transactions and before all other non-rename transactions;

computer program product means for causing a computer system to append all other non-rename transactions as a file system transaction log entry having a dynamic path identifier at the end of said transaction log.

9. The program product of claim 8, in which said object rename transactions include file rename transactions and directory rename transactions.

10. The program product of claim 8 wherein said non-rename object transactions include file and directory operation transactions.

11. The program product of claim 8, further comprising:

computer program product means for causing a computer system to optimize said transaction log by eliminating superseded transactions.

12. The program product of claim 11 wherein the computer program means to optimize for rename transactions includes:

computer program product means for causing a computer system to scan said transaction log for a mkdir transaction that matches the rename transaction and performing the inserting each object rename transaction step only if no mkdir transaction is found;

computer program product means for causing a computer system to scan said transaction log for a create transaction that matches the rename transaction and performing the inserting each object rename transaction step only if no create transaction is found;

computer program product means for causing a computer system to scan said transaction log for a rename transaction that matches the rename transaction and, if found, changing the "new" object name in the found rename transaction and propagating the "new" name to other rename object transactions, and inserting each new object rename transaction only if no rename transaction is found.

* * * * *